US012613728B2

(12) United States Patent
Morikawa et al.

(10) Patent No.: US 12,613,728 B2
(45) Date of Patent: Apr. 28, 2026

(54) HYPERVISOR COMMUNICATION CONGESTION CONTROL IN A VEHICLE DURING VIRTUAL MACHINE ACTIVATION

(71) Applicant: Panasonic Intellectual Property Management Co., Ltd., Osaka (JP)

(72) Inventors: Toshinari Morikawa, Kanagawa Ken (JP); Ikuya Mitsuya, Kanagawa Ken (JP); Motoyasu Taguchi, Kanagawa Ken (JP); Takashi Nishiwaki, Osaka Fu (JP); Yuya Aoki, Kanagawa Ken (JP); Mitsunori Eto, Gunma Ken (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 431 days.

(21) Appl. No.: 18/241,386

(22) Filed: Sep. 1, 2023

(65) Prior Publication Data

US 2024/0078128 A1      Mar. 7, 2024

(30) Foreign Application Priority Data

Sep. 2, 2022     (JP) ................................. 2022-140155

(51) Int. Cl.
*G06F 9/455* (2018.01)

(52) U.S. Cl.
CPC .................... *G06F 9/45558* (2013.01); *G06F 2009/45579* (2013.01)

(58) Field of Classification Search
CPC ............. G06F 9/45558; G06F 9/45533; G06F 2009/45579; H04L 67/12
(Continued)

(56) References Cited

U.S. PATENT DOCUMENTS 10,140,783 B2 * 11/2018 Thornburg .......... H04L 43/0805
10,365,950 B2 * 7/2019 Ditto ................... G06F 11/1484
(Continued)

FOREIGN PATENT DOCUMENTS

JP      2008-305083      12/2008
JP      2017-142647       8/2017
(Continued)

OTHER PUBLICATIONS

Office Action from Japan Patent Office (JPO) in Japanese Patent Appl. No. 2022-140155, dated Jan. 20, 2026, together with an English language translation.

*Primary Examiner* — Jacob D Dascomb
(74) *Attorney, Agent, or Firm* — Greenblum & Bernstein, P.L.C.

(57)          ABSTRACT
A control device is mountable on a vehicle. The control device includes a memory, and a hardware processor coupled to the memory. The hardware processor is configured to implement a first hypervisor and a second hypervisor. The first hypervisor controls execution of a first virtual machine. The second hypervisor performs communication with the first hypervisor via a gateway and controls execution of a second virtual machine. The hardware processor is configured to dynamically limit at least one of a communication traffic of application communication or a communication traffic of evaluation and verification communication, based on the application communication executed between the first hypervisor and the second hypervisor, and the evaluation and verification communication executed between the first hypervisor and the second hypervisor during activation of the first virtual machine and the second virtual machine, and based on a communication capacity of the gateway.

11 Claims, 6 Drawing Sheets

(58) Field of Classification Search
USPC .............................................. 718/1
See application file for complete search history.

(56) References Cited

U.S. PATENT DOCUMENTS

| | | | |
|---|---|---|---|
| 10,761,882 B2 * | 9/2020 | Abali | G06F 9/4856 |
| 2020/0092214 A1 | 3/2020 | Everhart et al. | |
| 2021/0234761 A1 * | 7/2021 | Fang | H04L 41/082 |
| 2022/0171612 A1 * | 6/2022 | Goto | G06F 9/45533 |

FOREIGN PATENT DOCUMENTS

| | | |
|---|---|---|
| JP | 2018-522358 | 8/2018 |
| JP | 2021-117692 | 8/2021 |
| JP | 2022-031363 | 2/2022 |
| JP | 2022-066959 | 5/2022 |
| JP | 2022-085861 | 6/2022 |

* cited by examiner

HYPERVISOR COMMUNICATION CONGESTION CONTROL IN A VEHICLE DURING VIRTUAL MACHINE ACTIVATION

CROSS-REFERENCE TO RELATED APPLICATIONS

This application is based upon and claims the benefit of priority from Japanese Patent Application No. 2022-140155, filed on Sep. 2, 2022, the entire contents of which are incorporated herein by reference.

FIELD

The present disclosure relates to a control device, a control system, and a control method.

BACKGROUND

Recently, in the trend of an integrated electronic control unit (ECU) in which a plurality of ECUs are integrated, there is an increasing need to evaluate and verify a virtual machine (VM) that operates across the plurality of ECUs. For example, JP 2022-31363 A discloses an example in which a context and a working memory of a virtual central processing unit (CPU) indicating an execution state and an execution content of the virtual CPU managed on a memory by a hypervisor are transferred onto a physically different ECU using a general-purpose network, thereby constructing a virtualization base across a plurality of ECUs.

There is a need to evaluate and verify whether or not a virtual machine operating across a plurality of ECUs is operating correctly. When application communication and evaluation and verification communication are simultaneously performed in such a virtual machine, a communication traffic further increases in order to further communicate an operation time (time stamp), an operation log, etc. of each step of the virtual machine as compared with a case where only the application communication is performed. However, in a control device disclosed in JP 2022-31363 A, a communication capacity of a communication network included in a gateway connecting different ECUs is not considered. Therefore, in the control device disclosed in JP 2022-31363 A, when the application communication and the evaluation and verification communication are simultaneously performed, there is a risk that the communication capacity of the network is strained and correct evaluation/verification cannot be performed.

The present disclosure has an object to provide a control device that can simultaneously perform application communication and evaluation and verification communication without straining a communication capacity of a network.

SUMMARY

A control device according to the present disclosure is mountable on a vehicle. The control device includes a memory, and a hardware processor coupled to the memory. The hardware processor is configured to implement a first hypervisor and a second hypervisor. The first hypervisor controls execution of a first virtual machine. The second hypervisor performs communication with the first hypervisor via a gateway and controls execution of a second virtual machine. The hardware processor is configured to dynamically limit at least one of a communication traffic of application communication or a communication traffic of evaluation and verification communication, based on the application communication executed between the first hypervisor and the second hypervisor, and the evaluation and verification communication executed between the first hypervisor and the second hypervisor during activation of the first virtual machine and the second virtual machine, and based on a communication capacity of the gateway.

DETAILED DESCRIPTION

First Embodiment

Hereinafter, various embodiments of a vehicle control system according to the present disclosure will be described with reference to the drawings.

Schematic Configuration of Vehicle Control System

First, a schematic configuration of a vehicle control system according to all embodiments described below will be described. A vehicle control system 10a is a system that is mounted on a vehicle and performs desired vehicle control, for example, by cooperative operation between an infotainment system represented by a car navigation system and an intelligent transportation system (ITS).

Figure 1:
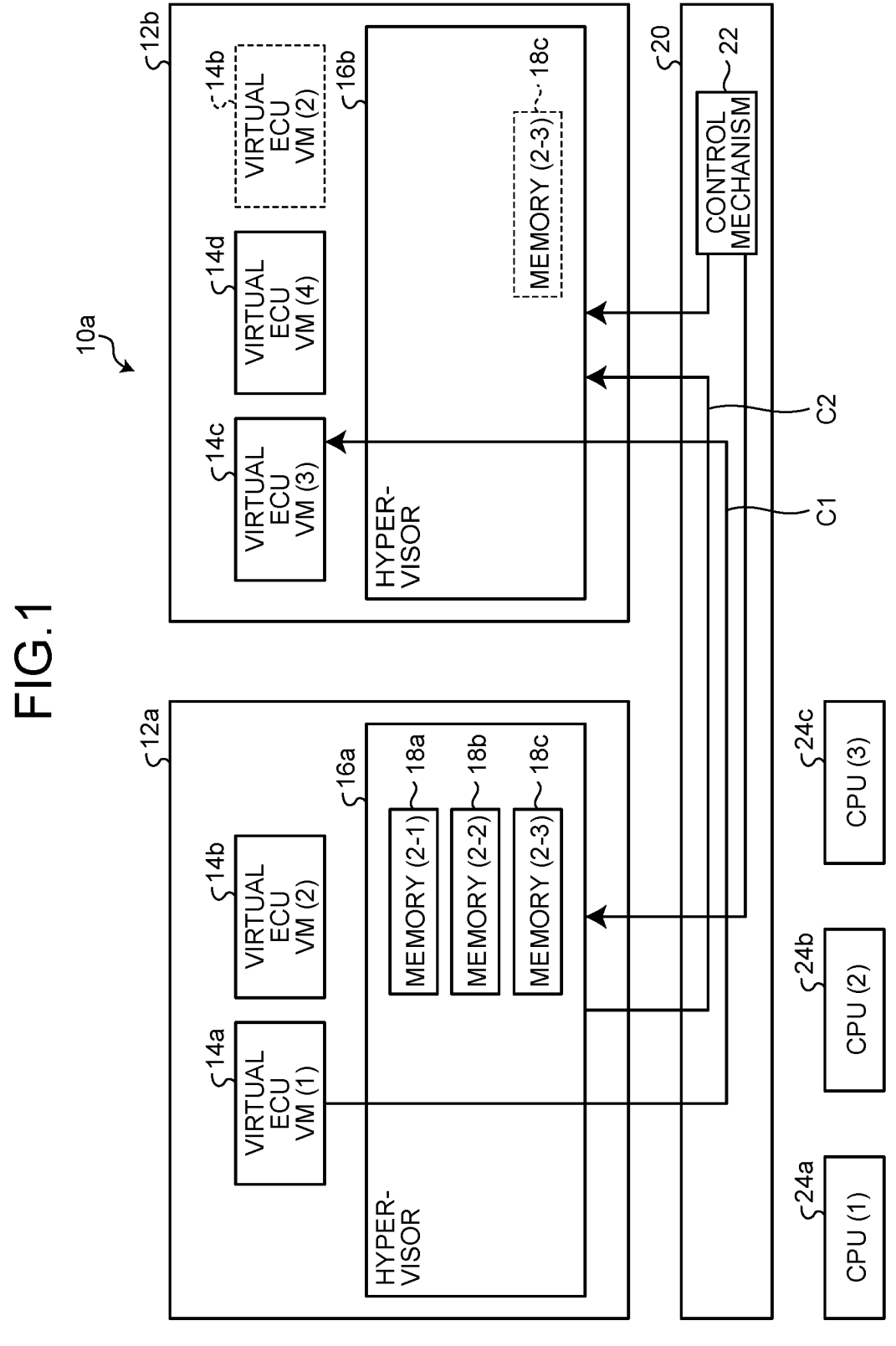
FIG. 1 is a block diagram illustrating an example of a schematic configuration of a vehicle control system.

A schematic configuration of the vehicle control system 10a will be described with reference to FIG. 1. FIG. 1 is a block diagram illustrating an example of the schematic configuration of the vehicle control system.

The vehicle control system 10a includes a machine 12a, a machine 12b, a gateway 20, a central processing unit (CPU) (1) 24a, a CPU (2) 24b, and a CPU (3) 24c.

The machine 12a is an example of an information processing device included in the infotainment system such as car navigation. The machine 12a is an example of a control device in the present disclosure. The machine 12b is an example of an information processing device included in the intelligent transportation system (ITS), for example. The machine 12b is an example of the control device in the present disclosure. The machine 12a and the machine 12b may be physically separated, or the machine 12a and the machine 12b may exist in one electronic control unit (ECU) or CPU.

The machine 12a includes a virtual ECU VM(1) 14a, a virtual ECU VM(2) 14b, and a hypervisor 16a.

The virtual ECU VM(1) 14a and the virtual ECU VM(2) 14b are virtual machines that execute various applications operating in the machine 12a and perform evaluation, verification, and the like related to the operation of the applications. Here, the evaluation and verification are, for example, processing of outputting trace data including various operation logs, time stamps, and the like related to an operation state of the machine 12a. The virtual ECU VM(1) 14a and the virtual ECU VM(2) 14b are examples of a first virtual machine according to the present disclosure.

The virtual ECU VM(1) 14a and the virtual ECU VM(2) 14b may operate on different operating systems (OS). In addition, the number of virtual ECUs VM included in the machine 12a is not limited.

The hypervisor 16a is software for virtualizing a computer. The hypervisor 16a generates each of the virtual ECU VM(1) 14a and the virtual ECU VM(2) 14b, which are virtual computers, in a physical machine. The hypervisor 16a is an example of a first hypervisor according to the present disclosure.

The hypervisor 16a includes a memory (2-1) 18a, a memory (2-2) 18b, and a memory (2-3) 18c. The memory (2-1) 18a, the memory (2-2) 18b, and the memory (2-3) 18c are storage regions obtained by dividing a main storage device (for example, a random access memory (RAM)) included in the machine 12a.

The memory (2-1) 18a is a storage region that stores data (for example, a program) and the like for operating the virtual ECU VM(2) 14b by a CPU (1) 24a. The memory (2-2) 18b is a storage region that stores data and the like for operating the virtual ECU VM(2) 14b by a CPU (2) 24b. The memory (2-3) 18c is a storage region that stores data and the like for operating the virtual ECU VM(2) 14b by a CPU (3) 24c.

Each of the CPU (1) 24a, the CPU (2) 24b, and the CPU (3) 24c operates the virtual ECU VM(1) 14a and the virtual ECU VM(2) 14b, in cooperation with the hypervisor 16a.

The machine 12b includes a virtual ECU VM(3) 14c, a virtual ECU VM(4) 14d, and a hypervisor 16b.

The virtual ECU VM(3) 14c and the virtual ECU VM(4) 14d are virtual machines that execute various applications operating in the machine 12b and perform evaluation, verification, and the like. The virtual ECU VM(3) 14c and the virtual ECU VM(4) 14d are examples of a second virtual machine according to the present disclosure. In addition, the machine 12b may include the virtual ECU VM(2) 14b illustrated in FIG. 1. The virtual ECU VM(2) 14b included in the machine 12b is obtained by transferring the virtual ECU VM(2) 14b included in the machine 12a to the machine 12b. As described above, the virtual ECU VM(2) 14b can be operated on the hypervisor 16b by transferring the virtual ECU VM between different machines. As a result, a calculation capability of the virtual ECU VM(2) 14b can be enhanced.

The virtual ECU VM(3) 14c and the virtual ECU VM(4) 14d may operate on different operating systems. In addition, the number of virtual ECU VMs included in the machine 12b is not limited.

The hypervisor 16b is software for virtualizing a computer. The hypervisor 16b generates each of the virtual ECU VM(3) 14c and the virtual ECU VM(4) 14d, which are virtual computers, in a physical machine. In the example of FIG. 1, the VM(2) 14b is also generated. The hypervisor 16b is an example of a second hypervisor according to the present disclosure.

The hypervisor 16b includes the memory (2-3) 18c. The memory (2-3) 18c is a memory transferred from the hypervisor 16a. The memory (2-3) 18c is a storage region storing data and the like for virtually operating the virtual ECU VM(2) 14b included in the machine 12a on the machine 12b as indicated by a dotted line in FIG. 1. As described above, as the virtual ECU VM(2) 14b is operated on the machine 12b, the calculation capability of the virtual ECU VM(2) 14b can be enhanced.

The gateway 20 controls communication between the machine 12a and the machine 12b. A specific communication method implemented by the gateway 20 is not limited. The gateway 20 includes a control mechanism 22. The control mechanism 22 monitors the amount of data flowing between the machine 12a and the machine 12b. In addition, in a case where the amount of data flowing between the machine 12a and the machine 12b, that is, a proportion of the total value of a communication traffic of application communication C1 and a communication traffic of evaluation and verification communication C2 with respect to a communication capacity of the gateway 20 is equal to or more than a predetermined proportion, the control mechanism 22 outputs a congestion control signal indicating that the communication capacity of the gateway 20 is strained. In a case where the gateway 20 is implemented by, for example, a local area network (LAN), the control mechanism 22 is, for example, a hub. Furthermore, in a case where the gateway 20 is implemented by, for example, a control area network (CAN), the control mechanism 22 is, for example, a vehicle interface processor (VIP).

In the vehicle control system 10a, the hypervisor 16a and the hypervisor 16b perform the application communication C1 with each other via the gateway 20, and execute an application included in the vehicle control system 10a.

Furthermore, the hypervisor 16a and the hypervisor 16b perform the evaluation and verification communication C2 with each other via the gateway 20, and perform evaluation and verification of the operation states of the machine 12a, the machine 12b, and an application executed by the virtual ECU when the vehicle control system 10a operates. The vehicle control system 10a may perform monitoring and diagnosis of the operation state when mounted on a product such as a vehicle, in addition to the evaluation, verification, and analysis in an experimental environment.

In the present embodiment, an example in which the control device of the present disclosure is applied to the vehicle control system 10a is described, but an application range of the control device is not limited to in-vehicle use, and for example, the control device can be applied to general embedded devices such as home appliances.

Functional Configuration of Hypervisor

Figure 2:
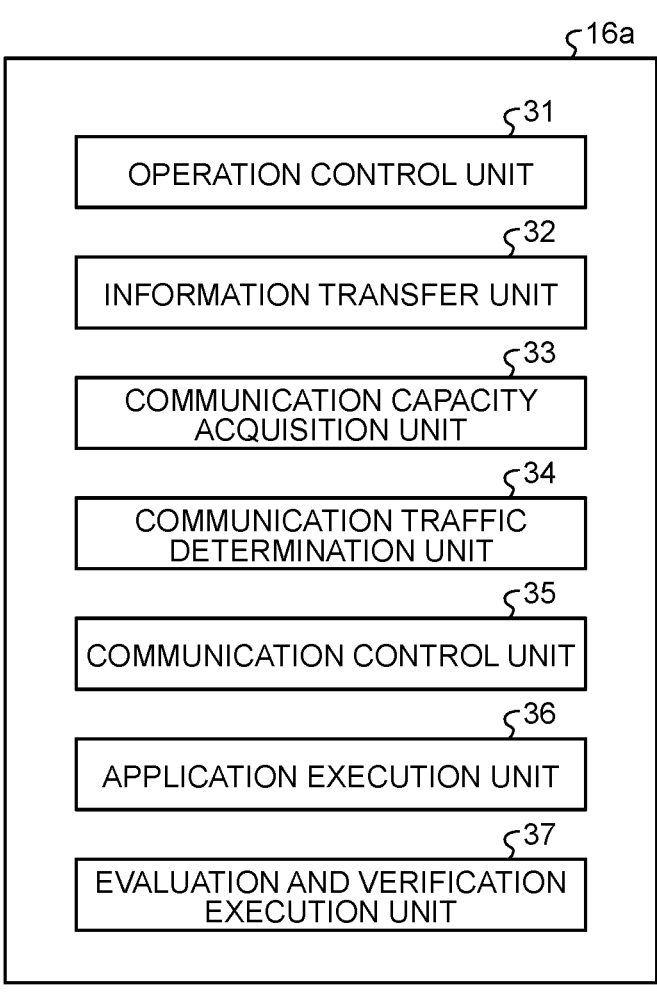
FIG. 2 is a functional block diagram illustrating an example of a functional configuration of a hypervisor included in the vehicle control system.

A functional configuration of the hypervisor 16a will be described with reference to FIG. 2. FIG. 2 is a functional block diagram illustrating an example of the functional configuration of the hypervisor included in the vehicle control system. Although the functional configuration of the hypervisor 16a is described here, the hypervisor 16b also has the same functional configuration as the hypervisor 16a.

The hypervisor 16a executes programs stored in the memory (2-1) 18a, the memory (2-2) 18b, and the memory (2-3) 18c by the CPU (1) 24a, the CPU (2) 24b, and the CPU (3) 24c, respectively, thereby implementing an operation control unit 31, an information transfer unit 32, a communication capacity acquisition unit 33, a communication traffic determination unit 34, a communication control unit 35, an application execution unit 36, and an evaluation and verification execution unit 37 illustrated in FIG. 2 as functional units.

The operation control unit 31 controls activation, operation suspension, and operation resuming of the virtual ECU VM(1) 14a and the virtual ECU VM(2) 14b. That is, the operation control unit 31 performs virtual power on/off of the virtual machine and virtual operation suspension and operation resuming.

Furthermore, the operation control unit 31 monitors whether or not an application operation and an evaluation and verification operation have been completed.

The information transfer unit 32 transfers a virtual CPU context for evaluation and verification from the hypervisor 16*a* to the hypervisor 16*b* before activation of the virtual ECU VM(1) 14*a*, the virtual ECU VM(2) 14*b*, the virtual ECU VM(3) 14*c*, and the virtual ECU VM(4) 14*d*. The virtual CPU context is an execution state and an execution content of a virtual CPU managed on a memory by a hypervisor, and is also referred to as parity data in JP 2022-31363 A. The information transfer unit 32 is an example of a transfer unit according to the present disclosure.

The communication capacity acquisition unit 33 acquires the communication capacity of the gateway 20.

The communication traffic determination unit 34 determines whether or not the total value of the communication traffic of the application communication C1 and the communication traffic of the evaluation and verification communication C2 between the hypervisor 16*a* and the hypervisor 16*b* during the activation of the virtual ECU VM(1) 14*a*, the virtual ECU VM(2) 14*b*, the virtual ECU VM(3) 14*c*, and the virtual ECU VM(4) 14*d* strains the communication capacity of the gateway 20.

More specifically, the communication traffic determination unit 34 compares the total value of the communication traffic of the application communication C1 and the communication traffic of the evaluation and verification communication C2 with the communication capacity of the gateway 20 acquired by the communication capacity acquisition unit 33 to determine whether or not the communication capacity of the gateway 20 is strained. Furthermore, the communication traffic determination unit 34 may determine that the communication capacity of the gateway 20 is strained when the congestion control signal output from the control mechanism 22 is received. Details thereof will be described later (see FIG. 3).

In addition, the communication traffic determination unit 34 monitors an amount of untransmitted data among data to be transmitted between the hypervisor 16*a* and the hypervisor 16*b*.

The communication control unit 35 dynamically limits at least one of the communication traffic of the application communication C1 or the communication traffic of the evaluation and verification communication C2 based on the communication capacity of the gateway 20, and an execution status of the application communication C1 executed between the hypervisor 16*a* and the hypervisor 16*b* and an execution status of the evaluation and verification communication C2 executed between the hypervisor 16*a* and the hypervisor 16*b* during the activation of the virtual ECU VM(1) 14*a*, the virtual ECU VM(2) 14*b*, the virtual ECU VM(3) 14*c*, and the virtual ECU VM(4) 14*d*, the virtual ECU VM(1) 14*a* and the virtual ECU VM(2) 14*b* being the first virtual machines, and the virtual ECU VM(3) 14*c* and the virtual ECU VM(4) 14*d* being the second virtual machines. For example, the communication traffic of the application communication C1 and the communication traffic of the evaluation and verification communication C2 are controlled based on the determination result of the communication traffic determination unit 34 in such a way that the total value of the communication traffic of the application communication C1 and the communication traffic of the evaluation and verification communication C2 does not exceed the communication capacity of the gateway 20.

More specifically, in a case where the congestion control signal output from the control mechanism 22 is received, the communication control unit 35 limits the communication traffic of the evaluation and verification communication C2, thereby prioritizing the application communication C1.

In addition, in a case where the amount of untransmitted data between the hypervisor 16*a* and the hypervisor 16*b* is equal to or more than a predetermined value, the communication control unit 35 suspends the operations of the virtual ECU VM(1) 14*a* and the virtual ECU VM(2) 14*b*, which are the first virtual machines, and the virtual ECU VM(3) 14*c* and the virtual ECU VM(4) 14*d*, which are the second virtual machines, and performs backport for uncommunicated data between the hypervisor 16*a* and the hypervisor 16*b*. The backport here refers to an operation of sending data back from a machine holding newer data among the virtual ECU contexts or device contexts to another machine. The condition for suspending the operations of the first virtual machines and the second virtual machines is not limited to a case where the amount of untransmitted data between the hypervisor 16*a* and the hypervisor 16*b* is equal to or more than the predetermined value, and the operation suspension condition may be appropriately set.

In addition, in a case where the amount of untransmitted data between the hypervisor 16*a* and the hypervisor 16*b* falls below the predetermined value, the communication control unit 35 resumes the operations of the virtual ECU VM(1) 14*a* and the virtual ECU VM(2) 14*b*, which are the first virtual machines, and the virtual ECU VM(3) 14*c* and the virtual ECU VM(4) 14*d*, which are the second virtual machines. The condition for resuming the operations of the first virtual machines and the second virtual machines is not limited to a case where the amount of untransmitted data between the hypervisor 16*a* and the hypervisor 16*b* falls below the predetermined value, and the operation resuming condition may be appropriately set.

The application execution unit 36 causes the virtual ECU VM(1) 14*a*, the virtual ECU VM(2) 14*b*, the virtual ECU VM(3) 14*c*, and the virtual ECU VM(4) 14*d* to execute the application.

The evaluation and verification execution unit 37 causes the virtual ECU VM(1) 14*a*, the virtual ECU VM(2) 14*b*, the virtual ECU VM(3) 14*c*, and the virtual ECU VM(4) 14*d* to perform evaluation and verification related to the operation of the vehicle control system 10*a*.

Outline of Communication Control

Figure 3:
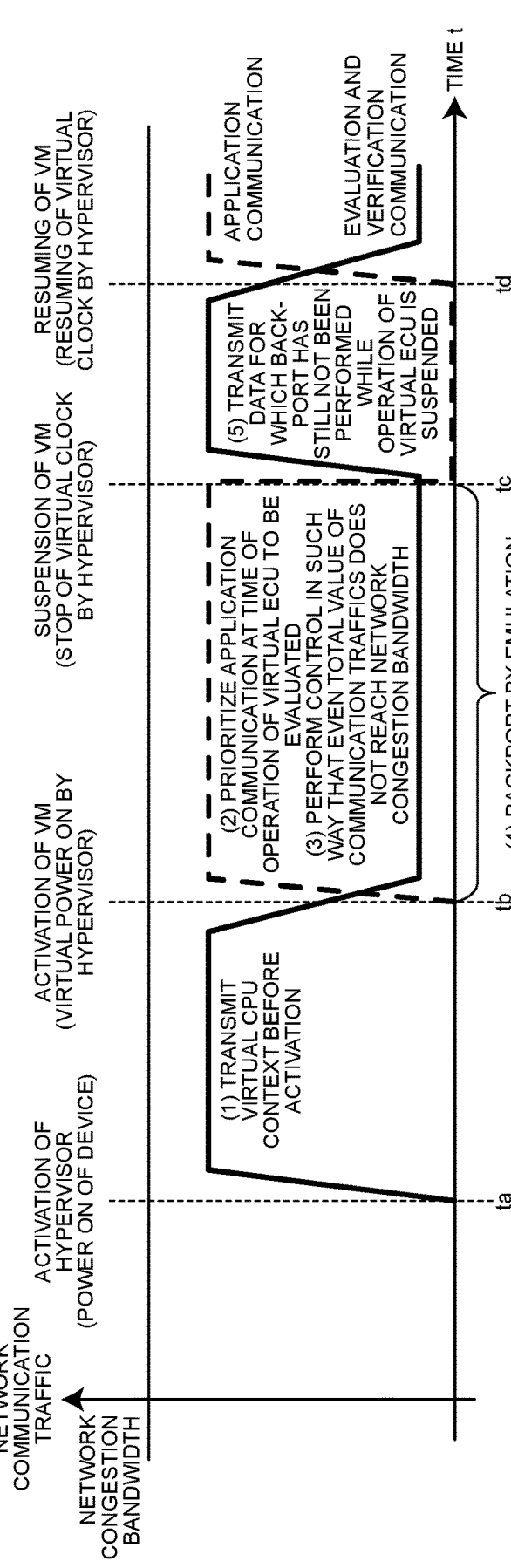
FIG. 3 is a diagram illustrating an outline of communication control performed by the hypervisor according to a first embodiment.

An outline of communication control performed by the hypervisor 16*a* will be described with reference to FIG. 3. FIG. 3 is a diagram illustrating the outline of the communication control performed by the hypervisor according to the first embodiment.

At time ta, the machine 12*a* activates the hypervisor 16*a*. Then, before the virtual ECU VM(1) 14*a*, the virtual ECU VM(2) 14*b*, the virtual ECU VM(3) 14*c*, and the virtual ECU VM(4) 14*d* are activated, the information transfer unit 32 of the hypervisor 16*a* transmits (transfers) the virtual CPU context to the hypervisor 16*b*.

When the transmission of the virtual CPU context is completed at time tb, the operation control unit 31 of the hypervisor 16*a* activates the virtual ECU VM(1) 14*a*, the virtual ECU VM(2) 14*b*, the virtual ECU VM(3) 14*c*, and the virtual ECU VM(4) 14*d*. Then, the communication traffic determination unit 34 of the hypervisor 16*a* determines whether or not the total value of the communication traffic of the application communication C1 and the communication traffic of the evaluation and verification communication C2 performed between the hypervisor 16*a* and the hypervisor 16*b* strains the communication capacity of the gateway 20. Then, the communication control unit 35 of the hypervisor 16*a* performs control in such a way that the total value of the communication traffic of the application communication C1 and the communication traffic of the evaluation and verification communication C2 does not exceed the communication capacity of the gateway 20. Specifically, when a virtual ECU VM to be evaluated is operating, the communication control unit 35 of the hypervisor 16*a* reduces the communication traffic of the evaluation and verification communication C2 and prioritizes the application communication C1.

Then, at time tc, in a case where it is determined that the amount of untransmitted data related to the evaluation and verification communication C2 is equal to or more than the predetermined value, the operation control unit 31 of the hypervisor 16*a* temporarily suspends the operation of the ECU VM to be evaluated by stopping a clocking operation. Then, while the operation of the evaluation target ECU VM is suspended, the communication control unit 35 communicates data for which backport has still not been performed, between the hypervisor 16*a* and the hypervisor 16*b*.

Furthermore, in a case where it is determined at time td that the amount of untransmitted data related to the evaluation and verification communication C2 is less than the predetermined value, the operation control unit 31 of the hypervisor 16*a* resumes the clocking operation. Then, the communication control unit 35 causes the hypervisor 16*a* to repeatedly perform the communication control performed between time tb and time tc.

Flow of Processing Executed by Hypervisor

Figure 4:
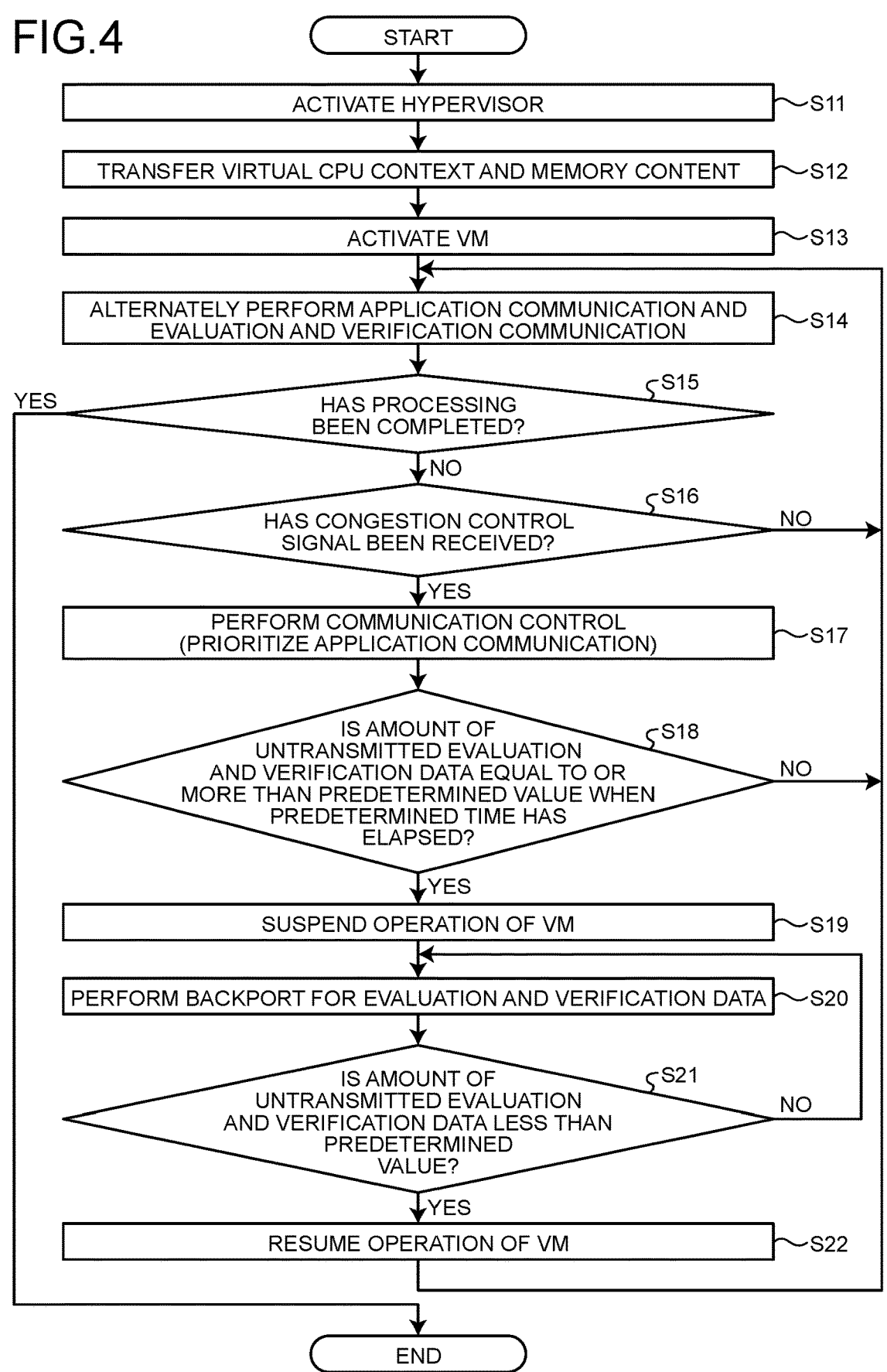
FIG. 4 is a flowchart illustrating an example of a flow of processing executed by the hypervisor according to the first embodiment.

A flow of processing executed by the hypervisor 16*a* will be described with reference to FIG. 4. FIG. 4 is a flowchart illustrating an example of the flow of the processing executed by the hypervisor according to the first embodiment. The hypervisor 16*b* cooperates with the hypervisor 16*a* to execute the same processing as illustrated in FIG. 4.

The operation control unit 31 activates the hypervisor 16*a* (step S11).

The information transfer unit 32 transfers the virtual CPU context and a memory content from the hypervisor 16*a* to the hypervisor 16*b* (step S12).

The operation control unit 31 activates the virtual ECU VM(1) 14*a* and the virtual ECU VM (2) 14*b* (step S13).

The communication control unit 35 alternately performs the application communication C1 and the evaluation and verification communication C2 (step S14).

The operation control unit 31 determines whether or not the application operation and the evaluation and verification operation have been completed (step S15). In a case where it is determined that the application operation and the evaluation and verification operation have been completed (step S15: Yes), the hypervisor 16*a* ends the processing of FIG. 4. On the other hand, in a case where it is determined that the application operation and the evaluation and verification operation have not been completed (step S15: No), the processing proceeds to step S16.

In a case where it is determined in step S15 that the application operation and the evaluation and verification operation have not been completed, the communication traffic determination unit 34 determines whether or not the congestion control signal has been received from the gateway 20 (step S16). In a case where it is determined that the congestion control signal has been received from the gateway 20 (step S16: Yes), the processing proceeds to step S17. On the other hand, in a case where it is determined that the congestion control signal has not been received from the gateway 20 (step S16: No), the processing returns to step S14.

In a case where it is determined in step S16 that the congestion control signal has been received from the gateway 20, the communication control unit 35 performs communication control to prioritize the application operation (step S17).

When a predetermined time has elapsed from reception of the congestion control signal, the communication traffic determination unit 34 determines whether or not the traffic of untransmitted evaluation and verification data is equal to or more than a predetermined value (step S18). In a case where it is determined that the amount of untransmitted evaluation and verification data is equal to or more than the predetermined value (step S18: Yes), the processing proceeds to step S19. On the other hand, when it is determined that the amount of untransmitted evaluation and verification data is not equal to or more than the predetermined value (step S18: No), the processing returns to step S14.

In a case where it is determined in step S18 that the amount of untransmitted evaluation and verification data is equal to or more than the predetermined value, the operation control unit 31 suspends the operations of the virtual ECU VM(1) 14*a* and the virtual ECU VM(2) 14*b* (step S19).

The communication control unit 35 performs backport for the untransmitted evaluation and verification data (step S20).

The communication traffic determination unit 34 determines whether or not the amount of untransmitted evaluation and verification data is less than the predetermined value (step S21). In a case where it is determined that the amount of untransmitted evaluation and verification data is less than the predetermined value (step S21: Yes), the processing proceeds to step S22. On the other hand, in a case where it is determined that the amount of untransmitted evaluation and verification data is not less than the predetermined value (step S21: No), the processing returns to step S20.

In a case where it is determined in step S21 that the amount of untransmitted evaluation and verification data is less than the predetermined value, the operation control unit 31 resumes the operations of the virtual ECU VM(1) 14*a* and the virtual ECU VM(2) 14*b* (step S22). Thereafter, the processing returns to step S14, and the above-described processing is repeated.

Operation and Effect of First Embodiment

As described above, the machine 12*a* (control device) according to the first embodiment is a control device that is mountable on a vehicle and includes the hypervisor 16*a* (first hypervisor) that generates the virtual ECU VM(1) 14*a* (first virtual machine) and the virtual ECU VM(2) 14*b* (first virtual machine), and the hypervisor 16*b* (second hypervisor) that generates the virtual ECU VM(3) 14*c* (second virtual machine) and the virtual ECU VM(4) 14*d* (second virtual machine) and performs communication with the first hypervisor via the gateway 20, and the machine 12*a* includes the communication control unit 35 that dynamically limits at least one of the communication traffic of the application communication C1 or the communication traffic of the evaluation and verification communication C2 based on the execution status of the application communication C1 executed between the hypervisor 16*a* and the hypervisor 16*b* and the execution status of the evaluation and verification communication C2 executed between the hypervisor 16*a* and the hypervisor 16*b* during the activation of the first virtual machines and the second virtual machines, and the communication capacity of the gateway 20. Therefore, the application communication and the evaluation and verification communication can be simultaneously performed without straining the communication capacity of the network.

In the machine 12*a* (control device) according to the first embodiment, in a case where the total value of the communication traffic of the application communication C1 and the communication traffic of the evaluation and verification communication C2 between the hypervisor 16*a* (first hypervisor) and the hypervisor 16*b* (second hypervisor) during the activation of the virtual ECU VM(1) 14*a* (first virtual machine), the virtual ECU VM(3) 14*c* (second virtual machine), and the virtual ECU VM(4) 14*d* (second virtual machine) strains the communication capacity of the gateway 20, the communication control unit 35 performs control in such a way that the total value of the communication traffic of the application communication C1 and the communication traffic of the evaluation and verification communication C2 does not exceed the communication capacity of the gateway 20. Therefore, the application communication and the evaluation and verification communication can be simultaneously performed without straining the communication capacity of the network.

In addition, in the machine 12*a* (control device) according to the first embodiment, the communication control unit 35 determines whether or not the communication capacity of the gateway 20 is strained based on the congestion control signal indicating that a communication traffic of the gateway 20 exceeds a threshold. Therefore, it is possible to easily determine whether or not the communication capacity of the gateway 20 is strained.

Further, in the machine 12*a* (control device) according to the first embodiment, the communication control unit 35 prioritizes the application communication C1 in a case where the congestion control signal is acquired. The application executed by the virtual ECU at this time does not need to consider the congestion control signal. Therefore, the communication capacity can be controlled without affecting the operation of the application communication C1.

In addition, the machine 12*a* (control device) according to the first embodiment further includes the information transfer unit 32 (transfer unit) that transfers the execution state and the execution content of the virtual CPU for evaluation and verification from the hypervisor 16*a* (first hypervisor) to the hypervisor 16*b* (second hypervisor) before the virtual ECU VM(1) 14*a* (first virtual machine), the virtual ECU VM(2) 14*b* (first virtual machine), the virtual ECU VM(3) 14*c* (second virtual machine), and the virtual ECU VM(4) 14*d* (second virtual machine) are activated. Therefore, information for evaluation and verification can be shared between the hypervisor 16*a* and the hypervisor 16*b*.

Furthermore, in the machine 12*a* (control device) according to the first embodiment, in a case where the amount of untransmitted data between the hypervisor 16*a* (first hypervisor) and the hypervisor 16*b* (second hypervisor) is equal to or more than a predetermined value, the communication control unit 35 suspends the operations of the virtual ECU VM(1) 14*a*, the virtual ECU VM(2) 14*b* (first virtual machines), the virtual ECU VM(3) 14*c*, and the virtual ECU VM(4) 14*d* (second virtual machines), and performs transmission of uncommunicated data between the hypervisor 16*a* (first hypervisor) and the hypervisor 16*b* (second hypervisor). Therefore, in a case where uncommunicated data of the evaluation and verification communication C2 is accumulated, the uncommunication data can be transmitted and received without affecting the operation of the application communication C1 by suspending the operations of the first virtual machines and the second virtual machines.

In addition, in the machine 12*a* (control device) according to the first embodiment, in a case where the amount of untransmitted data between the hypervisor 16*a* (first hypervisor) and the hypervisor 16*b* (second hypervisor) falls below the predetermined value, the communication control unit 35 resumes the operations of the virtual ECU VM(1) 14*a*, the virtual ECU VM(2) 14*b* (first virtual machines), the virtual ECU VM(3) 14*c*, and the virtual ECU VM(4) 14*d* (second virtual machines). Therefore, it is possible to easily resume the normal communication operation, and it is thus possible to evaluate and verify the operation state for a long time even in a case where the application communication C1 and the evaluation and verification communication C2 are continuously operated.

Second Embodiment

Figure 5:
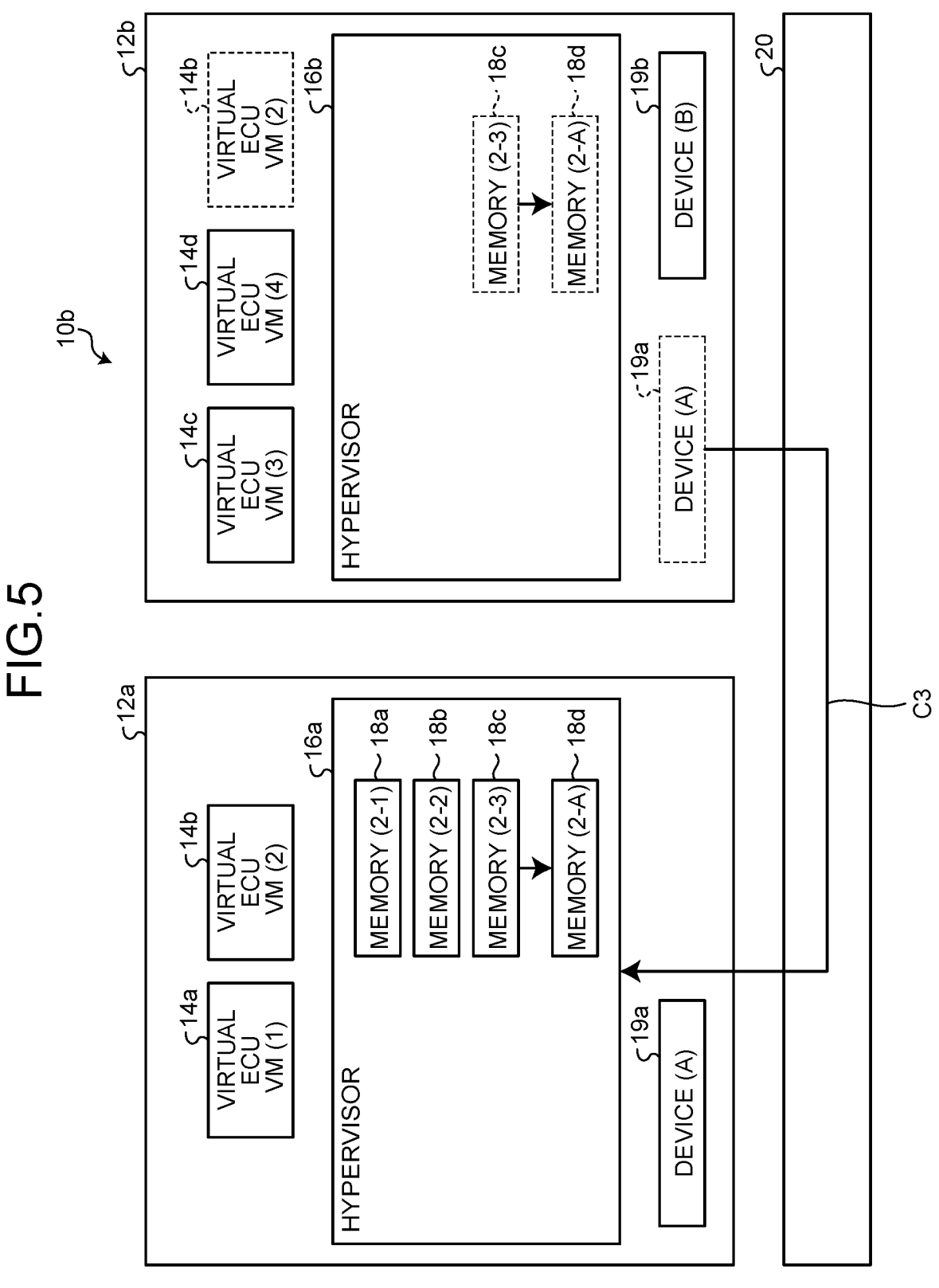
FIG. 5 is a block diagram illustrating an example of a schematic configuration of a vehicle control system according to a second embodiment.

Next, a vehicle control system 10*b* according to a second embodiment will be described.
Schematic Configuration of Vehicle Control System A schematic configuration of a vehicle control system 10*b* will be described with reference to FIG. 5. FIG. 5 is a block diagram illustrating an example of the schematic configuration of the vehicle control system according to the second embodiment; In FIG. 5, the CPU (1) 24*a*, the CPU (2) 24*b*, and the CPU (3) 24*c* illustrated in FIG. 1 are omitted in order to simplify the description. The internal structure of a gateway 20 is also omitted.

In a general embedded device, a device that is used by and is subordinate to a corresponding hypervisor exists for all the hypervisors. Therefore, a specific device can be controlled only by a specific hypervisor. The vehicle control system 10*b* according to the present embodiment has a function of virtually generating a device by a hypervisor in a case where a specific device subordinate to a hypervisor that executes processing by using the specific device does not exist.

The schematic configuration of the vehicle control system 10*b* is substantially the same as the schematic configuration of the vehicle control system 10*a* described in the first embodiment, but is different in that the vehicle control system 10*b* has a function of virtually generating a device that is used by and is subordinate to a hypervisor.

In FIG. 5, a device (A) 19*a* subordinate to a hypervisor 16*a* exists, and a device (B) 19*b* subordinate to a hypervisor 16*b* exists. The device (A) 19*a* and the device (B) 19*b* include, for example, a device used for evaluation and verification such as a serial port. Furthermore, the device includes an input and output device such as a display or a speaker, a communication device such as Wi-Fi or Bluetooth (registered trademark), and the like.

In this case, since the device (A) 19*a* subordinate to the hypervisor 16*b* does not exist, the hypervisor 16*b* cannot use the device (A) 19*a*.

In the vehicle control system 10*b*, the hypervisor 16*b* has a function of virtually generating the device (A) 19*a* subordinate to the hypervisor 16*b*. In FIG. 5, the virtually formed device (A) 19*a* subordinate to the hypervisor 16*b* is indicated by a dotted line to indicate that the device (A) 19*a* is a virtual device.

In FIG. 5, a memory (2-A) 18*d* is a storage region storing data for a virtual ECU VM(2) 14*b* to use the device (A) 19*a*. The hypervisor 16*a* transfers a memory (2-3) 18*c* and the memory (2-A) 18*d* to the hypervisor 16*b*, so that the hypervisor 16*b* can execute processing by using the virtually generated device (A) 19*a* subordinate to the hypervisor 16*b*.

In addition, since the generated device (A) 19*a* subordinate to the hypervisor 16*b* is a virtual device, when executing processing using the device (A) 19*a*, the hypervisor 16*b* performs evaluation and verification communication C3 to send the use data of the device (A) 19*a* back to the hypervisor 16*a*. Then, communication between the hypervisor 16*a* and the hypervisor 16*b* is managed by the communication control method described in the first embodiment, so that a communication traffic in this case does not strain the network capacity.

In this manner, the hypervisor 16*b* operates as if the device (A) 19*a* subordinate to the hypervisor 16*b* exists.
Functional Configuration of Hypervisor Next, a functional configuration of the hypervisors 16*a* and 16*b* included in the vehicle control system 10*b* will be described. Both the hypervisor 16*a* and the hypervisor 16*b* include a virtual device generation unit 38 (not illustrated) in addition to the functional configuration illustrated in FIG. 2.

In a case where there is no device that is used by a virtual CPU context and is subordinate to the hypervisor 16*a* (first hypervisor) or the hypervisor 16*b* (second hypervisor) that receives the virtual CPU context, the virtual device generation unit 38 virtually generates the corresponding device. The virtual device generation unit 38 is an example of a generation unit according to the present disclosure.
Operation and Effect of Second Embodiment As described above, the machine 12*b* (control device) according to the second embodiment further includes the virtual device generation unit 38 (generation unit) that virtually generates a device subordinate to the hypervisor 16*b* in a case where there is no device that is used by the virtual CPU and is subordinate to the hypervisor 16*b* (second hypervisor) that receives the execution state and execution content of the virtual CPU for evaluation and verification. Therefore, even in a case where there is no device that is used when the hypervisors 16*a* and 16*b* execute processing and is subordinate to the hypervisors 16*a* and 16*b*, the processing can be executed as if the device exists.

Third Embodiment

Figure 6:
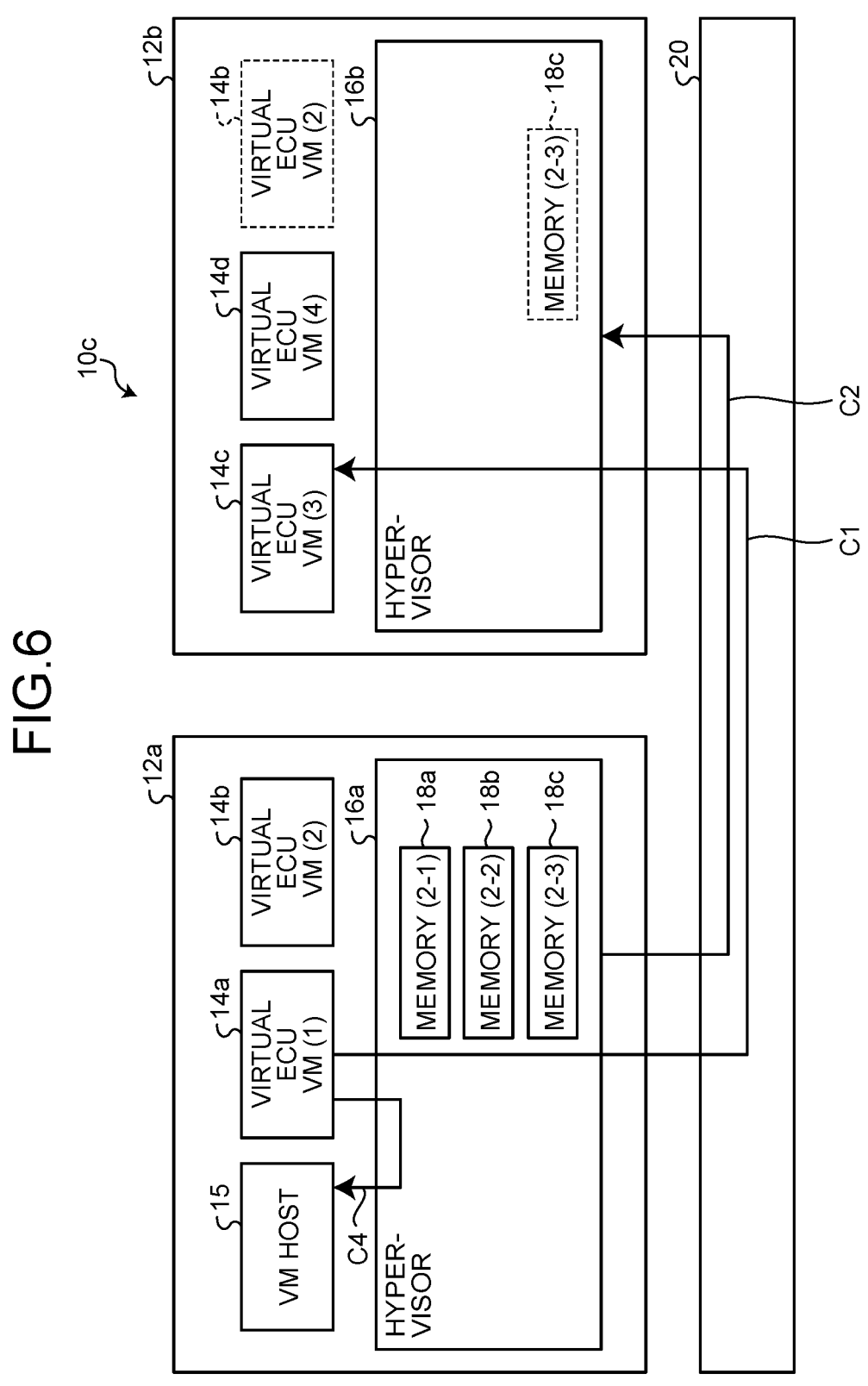
FIG. 6 is a block diagram illustrating an example of a schematic configuration of a vehicle control system according to a third embodiment.

Next, a vehicle control system 10*c* according to a third embodiment will be described.
Schematic Configuration of Vehicle Control System A schematic configuration of the vehicle control system 10*c* will be described with reference to FIG. 6. FIG. 6 is a block diagram illustrating an example of the schematic configuration of the vehicle control system according to the third embodiment. In FIG. 6, the CPU (1) 24*a*, the CPU (2) 24*b*, and the CPU (3) 24*c* illustrated in FIG. 1 are omitted in order to simplify the description. The internal structure of a gateway 20 is also omitted.

A hypervisor 16*a* included in the vehicle control system 10*c* has a function of causing a VM host 15, which is an example of a virtual machine, to execute some of functions of the hypervisor 16*a*.

Specifically, the VM host 15 executes by proxy some of the functions of the hypervisor 16*a* by performing virtual power on/off of a machine 12*a*, virtual operation suspension and operation resuming, communication control based on a congestion control signal acquired from the gateway 20, and the like that are performed by the hypervisor 16*a* in the first embodiment and the second embodiment.

Further, the VM host 15 may collect information from a virtual ECU VM(1) 14*a* instead of the hypervisor 16*a*, for example. That is, the VM host 15 may perform information communication C4 from the virtual ECU VM(1) 14*a* to the VM host 15 via the hypervisor 16*a*.

The VM host 15 may perform the information communication C4 from a virtual ECU VM(2) 14*b* via the hypervisor 16*a* and collect information of the virtual ECU VM(2) 14*b*.

In addition, in the vehicle control system 10*c*, a machine 12*b* may include a virtual machine having the same function as the VM host 15.
Functional Configuration of Hypervisor Next, a functional configuration of the hypervisor 16*a* included in the vehicle control system 10*c* will be described. In any case, the hypervisor 16*a* causes the VM host 15 to execute by proxy some of the functions of the functional configuration illustrated in FIG. 2. The functional configuration of the hypervisor 16*a* differs depending on which function is to be executed by the VM host 15 by proxy. For example, in a case where the VM host 15 executes the function of the communication control unit 35 by proxy, the hypervisor 16*a* has a functional configuration obtained by removing the communication control unit 35 from the functional configuration illustrated in FIG. 2. Furthermore, in a case where the VM host 15 executes the functions of the communication traffic determination unit 34 and the communication control unit 35 by proxy, the hypervisor 16*a* has a functional configuration obtained by removing the communication traffic determination unit 34 and the communication control unit 35 from the functional configuration illustrated in FIG. 2.

Then, the hypervisor 16*a* includes an information transmission and reception unit 39 (not illustrated) having an information transmission and reception function of performing the information communication C4 with the VM host 15 and an information transmission and reception function of performing the information communication C4 with the VM host 15 from the virtual ECU VM(1) 14*a* via the hypervisor 16*a*.

As the VM host 15 is provided, in a case where a modification (for example, a specification change) occurs in the hypervisor 16*a*, it is possible to cope with the modification with less trouble by changing a VM host 15 side. In addition, the virtual ECU VM(1) 14*a* and the virtual ECU VM(2) 14*b* are not affected by the malfunction of the VM host 15.

Meanwhile, as the VM host 15 is provided, it is necessary to perform the information communication C4. Therefore, the operation may be delayed due to an increase in overhead. However, since the amount of overhead can be reduced by, for example, a hardware support mechanism, the advantage obtained by providing the VM host 15 described above overweighs the disadvantage.
Operation and Effect of Third Embodiment As described above, the machine 12*a* (control device) according to the third embodiment includes the VM host 15 (virtual machine) that performs communication with the hypervisor 16*a* to execute a part of processing executed by the hypervisor 16*a* by proxy. Therefore, since a modification operation such as a specification change can be performed without changing the hypervisor 16*a*, it is possible to cope with the modification operation with less trouble.

Although the embodiments of the present disclosure have been described above, these embodiments have been presented as examples, and are not intended to limit the scope of the present invention. These novel embodiments can be implemented in various other forms. In addition, various omissions, substitutions, and changes can be made without departing from the gist of the invention. In addition, these embodiments are included in the scope and gist of the invention, and are included in the invention described in the claims and equivalents thereof.

The present disclosure may have the following configuration.

(1)

A control device mountable on a vehicle, including:

a first hypervisor that controls execution of a first virtual machine;

a second hypervisor that performs communication with the first hypervisor via a gateway and controls execution of a second virtual machine; and a communication control unit that dynamically limits at least one of a communication traffic of application communication or a communication traffic of evaluation and verification communication, based on the application communication executed between the first hypervisor and the second hypervisor, and the evaluation and verification communication executed between the first hypervisor and the second hypervisor during activation of the first virtual machine and the second virtual machine, and based on a communication capacity of the gateway.

(2)

The control device according to the foregoing (1), wherein in a case where a total value of the communication traffic of the application communication and the communication traffic of the evaluation and verification communication between the first hypervisor and the second hypervisor during the activation of the first virtual machine and the second virtual machine strains the communication capacity of the gateway, the communication control unit performs control in such a way that the total value of the communication traffic of the application communication and the communication traffic of the evaluation and verification communication does not exceed the communication capacity of the gateway.

(3)

The control device according to the foregoing (1) or (2), wherein the communication control unit determines whether or not the communication capacity of the gateway is strained based on a congestion control signal indicating that a communication traffic of the gateway exceeds a threshold.

(4)

The control device according to the foregoing (3), wherein the communication control unit prioritizes the application communication in a case where the communication control unit acquires the congestion control signal.

(5)

The control device according to any one of the foregoing (1) to (4), further including a transfer unit that transfers an execution state and an execution content of a virtual CPU for evaluation and verification from the first hypervisor to the second hypervisor before the activation of the first virtual machine and the second virtual machine.

(6)

The control device according to any one of the foregoing (1) to (5), further including a generation unit that virtually generates a device subordinate to the second hypervisor that receives the execution state and the execution content of the virtual CPU for evaluation and verification, in a case where there is no device that is used by the virtual CPU and is subordinate to the second hypervisor.

(7)

The control device according to any one of the foregoing (1) to (6), wherein in a case where an amount of untransmitted data between the first hypervisor and the second hypervisor is equal to or more than a predetermined value, the communication control unit suspends operations of the first virtual machine and the second virtual machine and performs transmission of uncommunicated data between the first hypervisor and the second hypervisor.

(8)

The control device according to the foregoing (7), wherein in a case where the amount of untransmitted data between the first hypervisor and the second hypervisor falls below the predetermined value, the communication control unit resumes the operations of the first virtual machine and the second virtual machine.

(9)

The control device according to any one of the foregoing (1) to (8), further including a virtual machine that performs communication with the first hypervisor to execute a part of processing to be executed by the first hypervisor by proxy.

(10)

A control system mountable on a vehicle, including a first hypervisor that controls execution of a first virtual machine;

a second hypervisor that performs communication with the first hypervisor via a gateway and controls execution of a second virtual machine; and a communication control unit that dynamically limits at least one of a communication traffic of application communication or a communication traffic of evaluation and verification communication, based on an execution status of the application communication executed between the first hypervisor and the second hypervisor, and an execution status of the evaluation and verification communication executed between the first hypervisor and the second hypervisor during activation of the first virtual machine and the second virtual machine, and based on a communication capacity of the gateway.

(11)

A control method executed by a control device that is mountable on a vehicle and includes a first hypervisor that controls execution of a first virtual machine, and a second hypervisor that performs communication with the first hypervisor via a gateway and controls execution of a second virtual machine, the control method including:

dynamically limiting at least one of a communication traffic of application communication or a communication traffic of evaluation and verification communication, based on an execution status of the application communication executed between the first hypervisor and the second hypervisor and an execution status of the evaluation and verification communication executed between the first hypervisor and the second hypervisor during activation of the first virtual machine and the second virtual machine, and based on a communication capacity of the gateway.

With the control device, the control system, and the control method according to the present disclosure, application communication and evaluation and verification communication can be simultaneously performed without straining a communication capacity of a network.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A control device mountable on a vehicle, comprising:
a memory; and
a hardware processor coupled to the memory, the hardware processor being configured to:
    implement a first hypervisor that controls execution of a first virtual machine and a second hypervisor that performs communication with the first hypervisor via a gateway and controls execution of a second virtual machine; and
    dynamically limit at least one of a communication traffic of application communication and a communication traffic of evaluation and verification communication based on the application communication executed between the first hypervisor and the second hypervisor, the evaluation and verification communication executed between the first hypervisor and the second hypervisor during activation of the first virtual machine and the second virtual machine, and a communication capacity of the gateway.

2. The control device according to claim 1, wherein the hardware processor is configured to perform control in such a way that the total value of the communication traffic of the application communication and the communication traffic of the evaluation and verification communication does not exceed the communication capacity of the gateway, in a case where a total value of the communication traffic of the application communication and the communication traffic of the evaluation and verification communication between the first hypervisor and the second hypervisor during the activation of the first virtual machine and the second virtual machine strains the communication capacity of the gateway.

3. The control device according to claim 2, wherein the hardware processor is configured to determine whether or not the communication capacity of the gateway is strained based on a congestion control signal indicating that a communication traffic of the gateway exceeds a threshold.

4. The control device according to claim 3, wherein the hardware processor is configured to prioritize the application communication in a case where a communication control unit acquires the congestion control signal.

5. The control device according to claim 1, wherein the hardware processor is further configured to transfer an execution state and an execution content of a virtual CPU for evaluation and verification from the first hypervisor to the second hypervisor before the activation of the first virtual machine and the second virtual machine.

6. The control device according to claim 5, wherein the hardware processor is further configured to virtually generate a device subordinate to the second hypervisor that receives the execution state and the execution content of the virtual CPU for evaluation and verification, in a case where there is no device that is used by the virtual CPU and is subordinate to the second hypervisor.

7. The control device according to claim 1, wherein the hardware processor is configured to suspend operations of the first virtual machine and the second virtual machine and perform transmission of uncommunicated data between the first hypervisor and the second hypervisor, in a case where an amount of untransmitted data between the first hypervisor and the second hypervisor is equal to or more than a predetermined value.

8. The control device according to claim 7, wherein the hardware processor is configured to resume the operations of the first virtual machine and the second virtual machine, in a case where the amount of untransmitted data between the first hypervisor and the second hypervisor falls below the predetermined value.

9. The control device according to claim 1, wherein the hardware processor is further configured to implement a virtual machine that performs communication with the first hypervisor to execute a part of processing to be executed by the first hypervisor by proxy.

10. A control system mountable on a vehicle, comprising:
a memory; and
a hardware processor coupled to the memory, the hardware processor being configured to:
    implement a first hypervisor that controls execution of a first virtual machine, and
    a second hypervisor that performs communication with the first hypervisor via a gateway and controls execution of a second virtual machine; and
    dynamically limit at least one of a communication traffic of application communication and a communication traffic of evaluation and verification communication based on an execution status of the application communication executed between the first hypervisor and the second hypervisor, an execution status of the evaluation and verification communication executed between the first hypervisor and the second hypervisor during activation of the first virtual machine and the second virtual machine, and a communication capacity of the gateway.

11. A control method executed by a control device that is mountable on a vehicle, includes a first hypervisor that controls execution of a first virtual machine, and a second hypervisor that performs communication with the first hypervisor via a gateway and controls execution of a second virtual machine, the control method comprising:
    dynamically limiting at least one of a communication traffic of application communication and a communication traffic of evaluation and verification communication based on an execution status of the application communication executed between the first hypervisor and the second hypervisor, an execution status of the evaluation and verification communication executed between the first hypervisor and the second hypervisor during activation of the first virtual machine and the second virtual machine, and a communication capacity of the gateway.

* * * * *